(12) United States Patent
Fattal et al.

(10) Patent No.: US 11,004,407 B2
(45) Date of Patent: *May 11, 2021

(54) MULTIVIEW BACKLIGHT, DISPLAY, AND METHOD EMPLOYING ACTIVE EMITTERS

(71) Applicant: LEIA INC., Menlo Park, CA (US)

(72) Inventors: David A. Fattal, Mountain View, CA (US); Ming Ma, Palo Alto, CA (US); Xuejian Li, Menlo Park, CA (US)

(73) Assignee: LEIA INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/659,476

(22) Filed: Oct. 21, 2019

(65) Prior Publication Data

US 2020/0051513 A1 Feb. 13, 2020

Related U.S. Application Data

(63) Continuation of application No. PCT/US2018/032142, filed on May 10, 2018.
(Continued)

(51) Int. Cl.
*G09G 3/34* (2006.01)
*H04N 13/351* (2018.01)
(Continued)

(52) U.S. Cl.
CPC .......... *G09G 3/342* (2013.01); *G02B 6/0068* (2013.01); *G02B 6/0073* (2013.01);
(Continued)

(58) Field of Classification Search
CPC ...... H04N 13/312; H04N 13/32; H04N 13/31; H04N 2013/405; H04N 13/00;
(Continued)

(56) References Cited

U.S. PATENT DOCUMENTS 6,304,288 B1 10/2001 Hamagishi
7,527,416 B2 5/2009 Lin
(Continued)

FOREIGN PATENT DOCUMENTS

CN 105842925 A 8/2016
JP 2006039041 A 2/2006
(Continued)

OTHER PUBLICATIONS

International Search Report and Written Opinion (ISRWO) by International Searching Authority (ISA) Korean Intellectual Property Office (KIPO), dated Sep. 14, 2018 (14 pages) for counterpart PCT Application No. PCT/US2018/032142.
(Continued)

*Primary Examiner* — William J Carter
*Assistant Examiner* — Omar Rojas Cadima
(74) *Attorney, Agent, or Firm* — J. Michael Johnson (57) ABSTRACT

A multiview backlight and a multiview display employ active emitters configured to provide a plurality of light beams having different principal angular directions corresponding to different view directions of the multiview display. A size of the active emitter is comparable to a size of a view pixel in the multiview display. A distance between active emitters is commensurate with a distance between adjacent multiview pixels of the multiview display. A multiview display further includes an array of light valves configured to modulate the directional light beams to display a multiview image.

20 Claims, 5 Drawing Sheets

Related U.S. Application Data (60) Provisional application No. 62/505,956, filed on May 14, 2017.

(51) Int. Cl.

| | | |
|---|---|---|
| *H04N 13/356* | (2018.01) | |
| *H04N 13/398* | (2018.01) | |
| *H04N 13/324* | (2018.01) | |
| *H04N 13/32* | (2018.01) | |
| *H04N 13/354* | (2018.01) | |
| *H04N 13/359* | (2018.01) | |
| *F21V 8/00* | (2006.01) | |

(52) U.S. Cl.
CPC ........... *G09G 3/3413* (2013.01); *H04N 13/32* (2018.05); *H04N 13/324* (2018.05); *H04N 13/351* (2018.05); *H04N 13/354* (2018.05); *H04N 13/356* (2018.05); *H04N 13/359* (2018.05); *H04N 13/398* (2018.05); *G09G 2320/0242* (2013.01)

(58) Field of Classification Search
CPC .. H04N 13/305; H04N 13/351; H04N 13/354; H04N 13/368; G02F 1/133504; G02F 2001/133607; G09G 3/34
See application file for complete search history.

(56) References Cited

U.S. PATENT DOCUMENTS

| | | | | |
|---|---|---|---|---|
| 7,580,186 | B2 * | 8/2009 | Mather | G02F 1/1323 |
| | | | | 359/463 |
| 8,810,750 | B2 | 8/2014 | Mun et al. | |
| 9,128,226 | B2 | 9/2015 | Fattal et al. | |
| 9,201,270 | B2 | 12/2015 | Fattal et al. | |
| 9,279,989 | B2 | 3/2016 | Song et al. | |
| 9,298,168 | B2 | 3/2016 | Taff et al. | |
| 9,372,349 | B2 * | 6/2016 | Brug | G02B 30/27 |
| 9,389,415 | B2 | 7/2016 | Fattal et al. | |
| 9,459,461 | B2 | 10/2016 | Santori et al. | |
| 9,557,466 | B2 | 1/2017 | Fattal | |
| 2007/0018585 | A1 * | 1/2007 | Ijzerman | H04N 13/359 |
| | | | | 315/15 |
| 2007/0147079 | A1 | 6/2007 | Wu et al. | |
| 2008/0252955 | A1 | 10/2008 | Redert | |
| 2008/0285282 | A1 * | 11/2008 | Karman | H01L 51/0096 |
| | | | | 362/249.16 |
| 2010/0118218 | A1 | 5/2010 | Eichenlaub | |
| 2010/0141868 | A1 | 6/2010 | St Hilaire et al. | |
| 2010/0245406 | A1 | 9/2010 | Redert et al. | |
| 2011/0157167 | A1 | 6/2011 | Bennett et al. | |
| 2012/0056914 | A1 | 3/2012 | Gass et al. | |
| 2015/0036068 | A1 | 2/2015 | Fattal et al. | |
| 2015/0268479 | A1 | 9/2015 | Woodgate et al. | |
| 2015/0316702 | A1 | 11/2015 | Ilmonen et al. | |
| 2016/0048060 | A1 * | 2/2016 | Chen | G02F 1/136277 |
| | | | | 362/603 |
| 2016/0187556 | A1 | 6/2016 | Bang et al. | |
| 2016/0379394 | A1 * | 12/2016 | Kim | H04N 13/31 |
| | | | | 345/629 |
| 2017/0299793 | A1 | 10/2017 | Fattal | |
| 2018/0011237 | A1 | 1/2018 | Fattal | |
| 2018/0156963 | A1 | 6/2018 | Fattal | |
| 2018/0188441 | A1 | 7/2018 | Fattal | |
| 2018/0188691 | A1 | 7/2018 | Fattal | |
| 2018/0196194 | A1 | 7/2018 | Fattal | |
| 2018/0278923 | A1 | 9/2018 | Fattal | |
| 2018/0299608 | A1 | 10/2018 | Fattal et al. | |
| 2018/0306965 | A1 | 10/2018 | Fattal | |
| 2019/0025494 | A1 | 1/2019 | Fattal et al. | |
| 2019/0155105 | A1 | 5/2019 | Aieta et al. | |
| 2019/0302336 | A1 | 10/2019 | Fattal et al. | |

FOREIGN PATENT DOCUMENTS

| | | |
|---|---|---|
| JP | 2012252937 A | 12/2012 |
| KR | 20120005765 A | 1/2012 |
| KR | 20120108479 A | 10/2012 |
| WO | 2017041073 A1 | 3/2017 |
| WO | 2018140063 A1 | 8/2018 |
| WO | 2018182917 A1 | 10/2018 |
| WO | 2018213100 A1 | 11/2018 |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

Reichelt et al.,"Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

* cited by examiner

MULTIVIEW BACKLIGHT, DISPLAY, AND METHOD EMPLOYING ACTIVE EMITTERS

CROSS-REFERENCE TO RELATED APPLICATIONS

This application is a continuation patent application of and claims the benefit of priority to International Application No. PCT/US2018/032142, filed May 10, 2018, which claims priority to U.S. Provisional Patent Application Ser. No. 62/505,956, filed May 14, 2017, and also to International Patent Application No. PCT/US2018/032131, filed May 10, 2018, the entirety of each of which is incorporated by reference herein.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

To overcome the limitations of passive displays associated with emitted light, many passive displays are coupled to an external light source. The coupled light source may allow these otherwise passive displays to emit light and function substantially as active displays. Examples of such coupled light sources are backlights. A backlight may serve as a source of light (often a panel backlight) that is placed behind an otherwise passive display to illuminate the passive display. For example, a backlight may be coupled to an LCD or an EP display. The backlight emits light that passes through the LCD or the EP display. The light emitted is modulated by the LCD or the EP display and the modulated light is then emitted, in turn, from the LCD or the EP display. Often backlights are configured to emit white light. Color filters are then used to transform the white light into various colors used in the display. The color filters may be placed at an output of the LCD or the EP display (less common) or between the backlight and the LCD or the EP display, for example. Alternatively, the various colors may be implemented by field-sequential illumination of a display using different colors, such as primary colors.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide backlighting employing active emitters with application to electronic displays. In various embodiments consistent with the principles herein, a multiview backlight is provided. The multiview backlight comprises active emitters configured to emit light. The active emitters may include a micro light emitting diode (μLED) or an organic micro light emitting diode (OLED). The active emitters may be configured to emit white light or light having color. The active emitters may be offset from adjacent active emitters, in part, to reduce or suppress color fringing, according to some embodiments.

Herein a 'two-dimensional display' or '2D display' is defined as a display configured to provide a view of an image that is substantially the same regardless of a direction from which the image is viewed (i.e., within a predefined viewing angle or range of the 2D display). A conventional liquid crystal display (LCD) found in may smart phones and computer monitors are examples of 2D displays. In contrast and herein, a 'multiview display' is defined as an electronic display or display system configured to provide different views of a multiview image in or from different view directions. In particular, the different views may represent different perspective views of a scene or object of the multiview image. Uses of multiview backlighting and multiview displays applicable to the display of multiview images described herein include, but are not limited to, mobile telephones (e.g., smart phones), watches, tablet computes, mobile computers (e.g., laptop computers), personal computers and computer monitors, automobile display consoles, cameras displays, and various other mobile as well as substantially non-mobile display applications and devices.

Figure 1A:
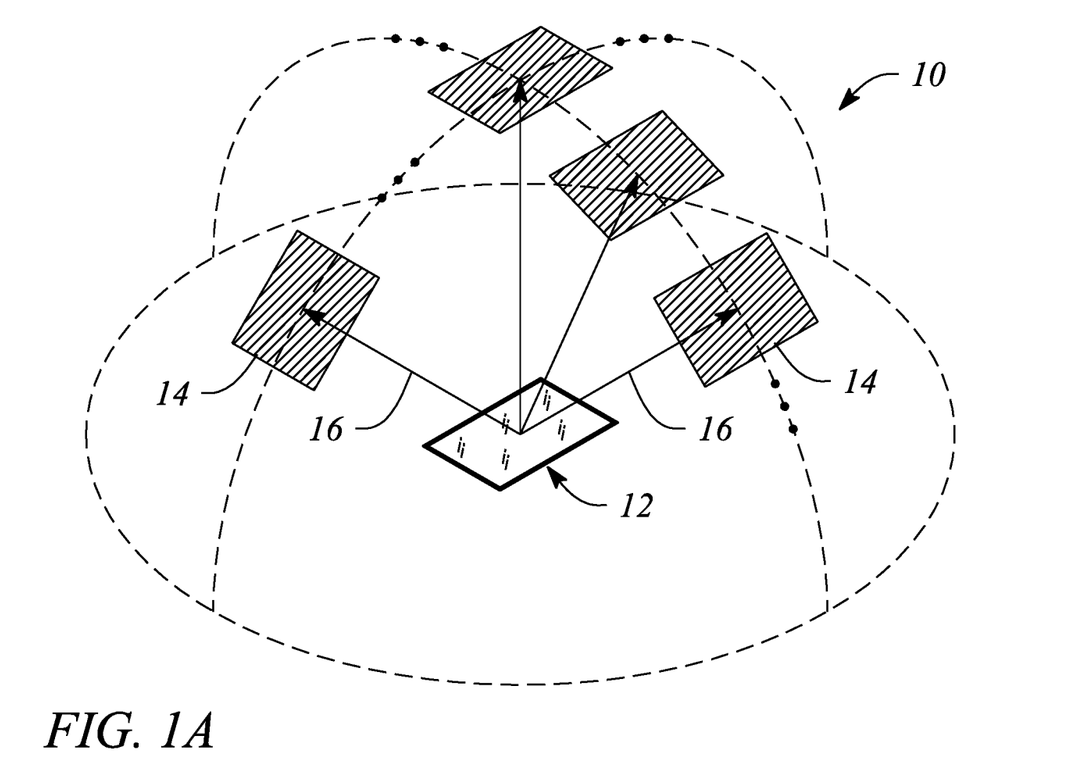
FIG. 1A illustrates a perspective view of a multiview display in an example, according to an embodiment consistent with the principles described herein.

FIG. 1A illustrates a perspective view of a multiview display 10 in an example, according to an embodiment consistent with the principles described herein. As illustrated in FIG. 1A, the multiview display 10 comprises a screen 12 to display a multiview image to be viewed. The screen 12 may be a display screen of a telephone (e.g., mobile telephone, smart phone, etc.), a tablet computer, a laptop computer, a computer monitor of a desktop computer, a camera display, or an electronic display of substantially any other device, for example.

The multiview display 10 provides different views 14 of the multiview image in different view directions 16 relative to the screen 12. The view directions 16 are illustrated as arrows extending from the screen 12 in various different principal angular directions; the different views 14 are illustrated as shaded polygonal boxes at the termination of the arrows (i.e., depicting the view directions 16); and only four views 14 and four view directions 16 are illustrated, all by way of example and not limitation. Note that while the different views 14 are illustrated in FIG. 1A as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14. A 2D display may be substantially similar to the multiview display 10, except that the 2D Display is generally configured to provide a single view (e.g., one view similar to view 14) of a displayed image as opposed to the different views 14 of the multiview image provided by the multiview display 10.

A view direction or equivalently a light beam having a direction corresponding to a view direction of a multiview display generally has a principal angular direction given by angular components $\{\theta, \varphi\}$, by definition herein. The angular component $\theta$ is referred to herein as the 'elevation component' or 'elevation angle' of the light beam. The angular component $\varphi$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\varphi$ is an angle in a horizontal plane (e.g., parallel to the multiview display screen plane).

Figure 1B:
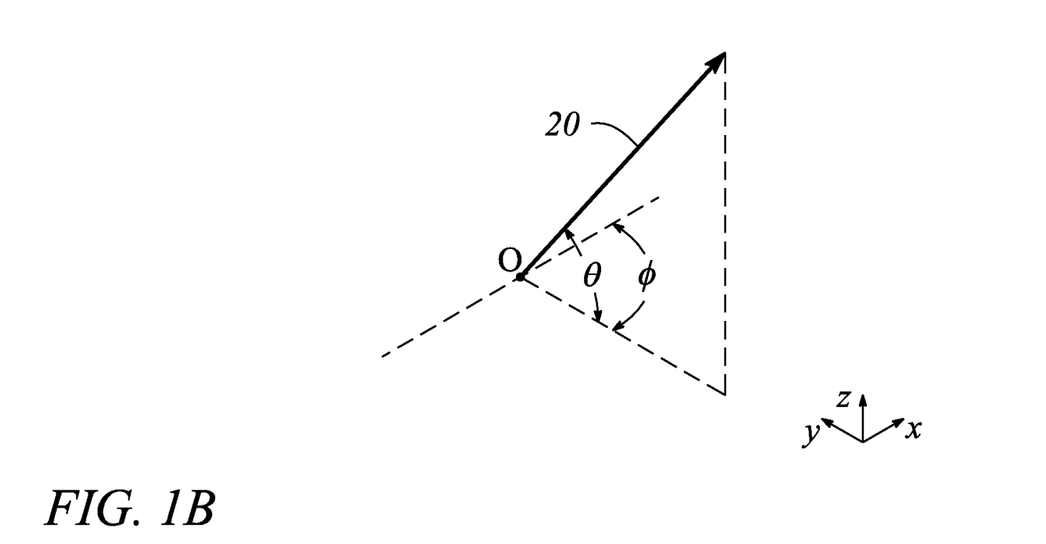
FIG. 1B illustrates a graphical representation of the angular components of a light beam having a particular principal angular direction corresponding to a view direction of a multiview display in an example, according to an embodiment consistent with the principles described herein.

FIG. 1B illustrates a graphical representation of the angular components $\{\theta, \varphi\}$ of a light beam 20 having a particular principal angular direction corresponding to a view direction (e.g., view direction 16 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

The term 'multiview' as used in the terms 'multiview image' and 'multiview display' is defined herein as a plurality of views representing different perspectives or including angular disparity between views of the view plurality. In addition, herein the term 'multiview' explicitly includes two or more different views (e.g., a minimum of three views and generally more than three views), by definition herein. In some embodiments, 'multiview display' as employed herein may be used to explicitly distinguish from a stereoscopic display that includes only two different views to represent a scene or an image. Note however, while multiview images and multiview displays may include more than two views, by definition herein, multiview images may be viewed (e.g., on a multiview display) as a stereoscopic pair of images by selecting only two of the multiview views to view at a time (e.g., one view per eye).

A 'multiview pixel' is defined herein as a set of view pixels representing pixels of views in each of a similar plurality of different views of a multiview display. In particular, a multiview pixel may have an individual view pixels corresponding to or representing a particular view pixel in each of the different views of the multiview image. Moreover, the view pixels of the multiview pixel are so-called 'directional pixels' in that each of the view pixels is associated with a predetermined view direction of a corresponding one of the different views, by definition herein. Further, according to various examples and embodiments, the different view pixels of a multiview pixel may have equivalent or at least substantially similar locations or coordinates in each of the different views. For example, a first multiview pixel may have individual view pixels corresponding to pixels located at $\{x_1, y_1\}$ in each of the different views of a multiview image, while a second multiview pixel may have individual view pixels corresponding to pixels located at $\{x_2, y_2\}$ in each of the different views, and so on.

In some embodiments, a number of view pixels in a multiview pixel may be equal to a number of views of the multiview display. For example, the multiview pixel may include sixty-four (64) view pixels in associated with a multiview display having or providing 64 different views. In another example, the multiview display may provide an eight by four array of views (i.e., 32 views) and the multiview pixel may include thirty-two (32) view pixels (i.e., one for each view). Additionally, each different view pixel may have an associated direction (e.g., light beam principal angular direction) that corresponds to a different one of the view directions corresponding to the 64 different views, for example.

Herein a 'collimator' is defined as substantially any optical device or apparatus that is configured to collimate light. According to various embodiments, an amount of collimation provided by the collimator may vary in a predetermined degree or amount from one embodiment to another. Herein, a 'collimation factor' is defined as a degree to which light is collimated. In particular, a collimation factor defines an angular spread of light rays within a collimated beam of light, by definition herein. For example, a collimation factor $\sigma$ may specify that a majority of light rays in a beam of collimated light is within a particular angular spread (e.g., +/−$\sigma$ degrees about a central or principal angular direction of the collimated light beam). The light rays of the collimated light beam may have a Gaussian distribution in terms of angle and the angular spread may be an angle determined by at one-half of a peak intensity of the collimated light beam, according to some examples.

Herein, an 'active emitter' is defined as an active source of light (e.g., an optical emitter configured to produce and emit light when activated). As such, an active emitter does not receive light from another source of light, by definition. Instead, the active emitter directly generates light when activated. The active emitter may be activated by applying a power source such as a voltage or a current, by definition herein. For example, the active emitter may comprise an optical emitter such as a light emitting diode (LED) that emits light when activated or turned on. Applying a voltage to terminals of the LED, for example, may activate the LED. In particular, herein the light source may be substantially any active source of light or comprise substantially any active optical emitter including, but not limited to, one or more of a light emitting diode (LED), a laser, an organic light emitting diode (OLED), a polymer light emitting diode, a plasma-based optical emitter, and a micro LED ($\mu$LED). The light produced by the active emitter may have a color (i.e., may include a particular wavelength of light), or may be a plurality or range of wavelengths (e.g., polychromatic light or white light). Different colors of light provided or produced by an active emitter may include, but are not limited to, primary colors (e.g., red, green, blue), for example. By definition herein, a 'color emitter' is an active emitter that provides light having a color. In some embodiments, the active emitter may comprise a plurality of active emitters. For example, the active emitter may include a set or group of active emitters. In some embodiments, at least one of the active emitters in the set or group of active emitters may generate light having a color, or equivalently a wavelength, that differs from a color or wavelength of light produced by at least one other optical emitter of the plurality.

Further by definition herein, the term 'broad-angle' as in 'broad-angle emitted light' is defined as light having a cone angle that is greater than a cone angle of the view of a multiview image or multiview display. In particular, in some embodiments, the broad-angle emitted light may have a cone angle that is greater than about sixty degrees (60°). In other embodiments, the broad-angle emitted light cone angle may be greater than about fifty degrees (50°), or greater than about forty degrees (40°). For example, the cone angle of the broad-angle emitted light may be about one hundred twenty degrees (120°). Alternatively, the broad-angle emitted light may have an angular range that is greater than plus and minus forty-five degrees (e.g., >±45°) relative to the normal direction of a display. In other embodiments, the broad-angle emitted light angular range may be greater than plus and minus fifty degrees (e.g., >±50°), or greater than plus and minus sixty degrees (e.g., >±60°), or greater than plus and minus sixty-five degrees (e.g., >±65°). For example, the angular range of the broad-angle emitted light may be greater than about seventy degrees on either side of the normal direction of the display (e.g., >±70°). A 'broad-angle backlight' is a backlight configured to provide broad-angle emitted light, by definition herein.

In some embodiments, the broad-angle emitted light cone angle may defined to be about the same as a viewing angle of an LCD computer monitor, an LCD tablet, an LCD television, or a similar digital display device meant for broad-angle viewing (e.g., about ±40-65°). In other embodiments, broad-angle emitted light may also be characterized or described as diffuse light, substantially diffuse light, non-directional light (i.e., lacking any specific or defined directionality), or as light having a single or substantially uniform direction.

Further, as used herein, the article 'a' is intended to have its ordinary meaning in the patent arts, namely 'one or more'. For example, 'an active emitter' means one or more active emitters and as such, 'the active emitter' means 'active emitter(s)' herein. Also, any reference herein to 'top', 'bottom', 'upper', 'lower', 'up', 'down', 'front', 'back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 2A:
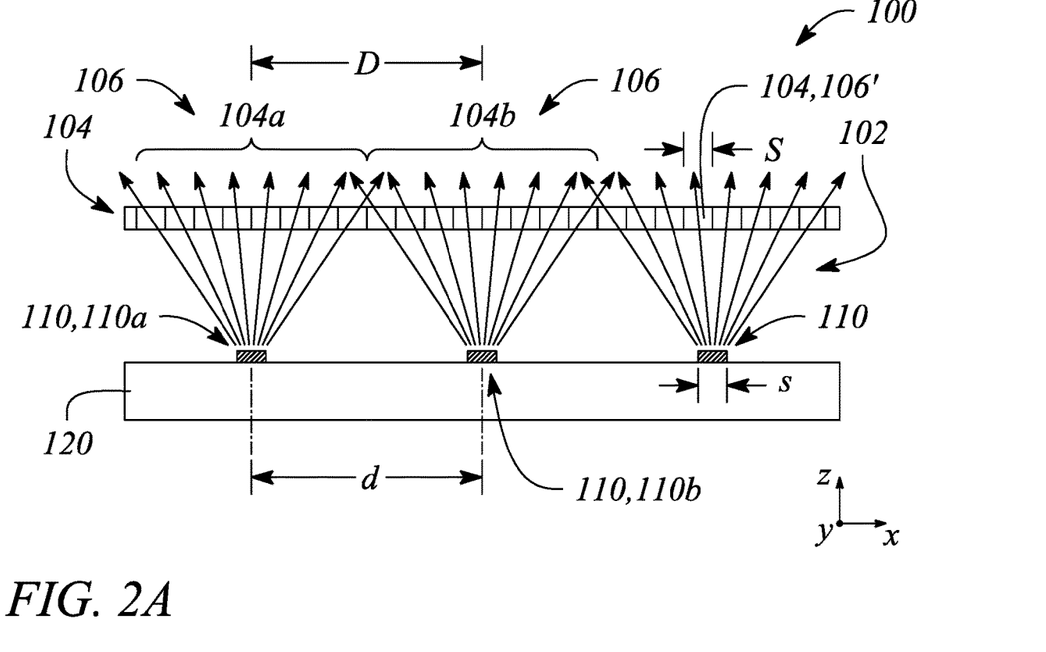
FIG. 2A illustrates a cross-sectional view of a multiview backlight in an example, according to an embodiment consistent with the principles described herein.
Figure 2B:
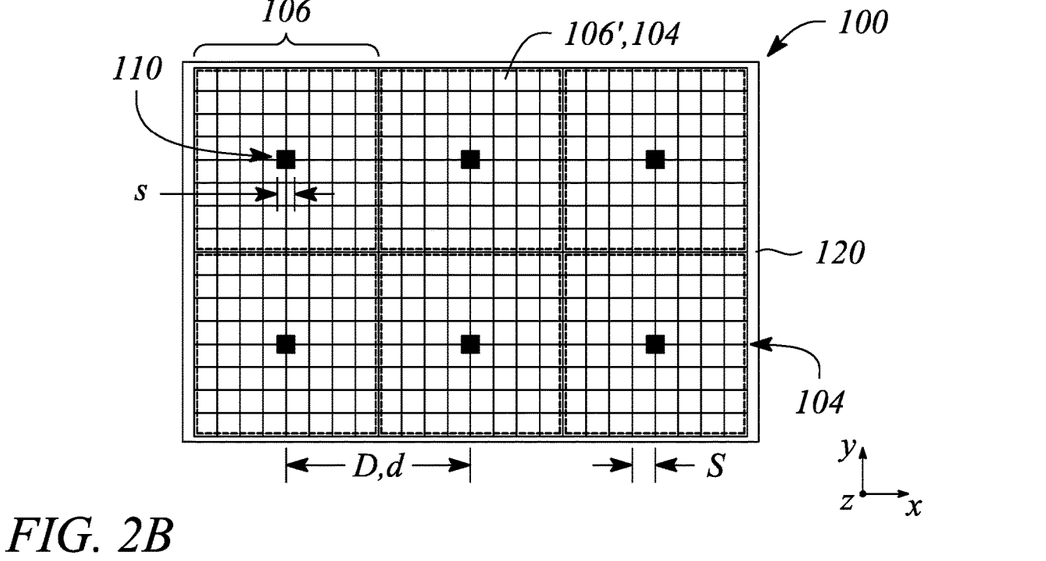
FIG. 2B illustrates a plan view of a multiview backlight in an example, according to an embodiment consistent with the principles described herein.
Figure 2C:
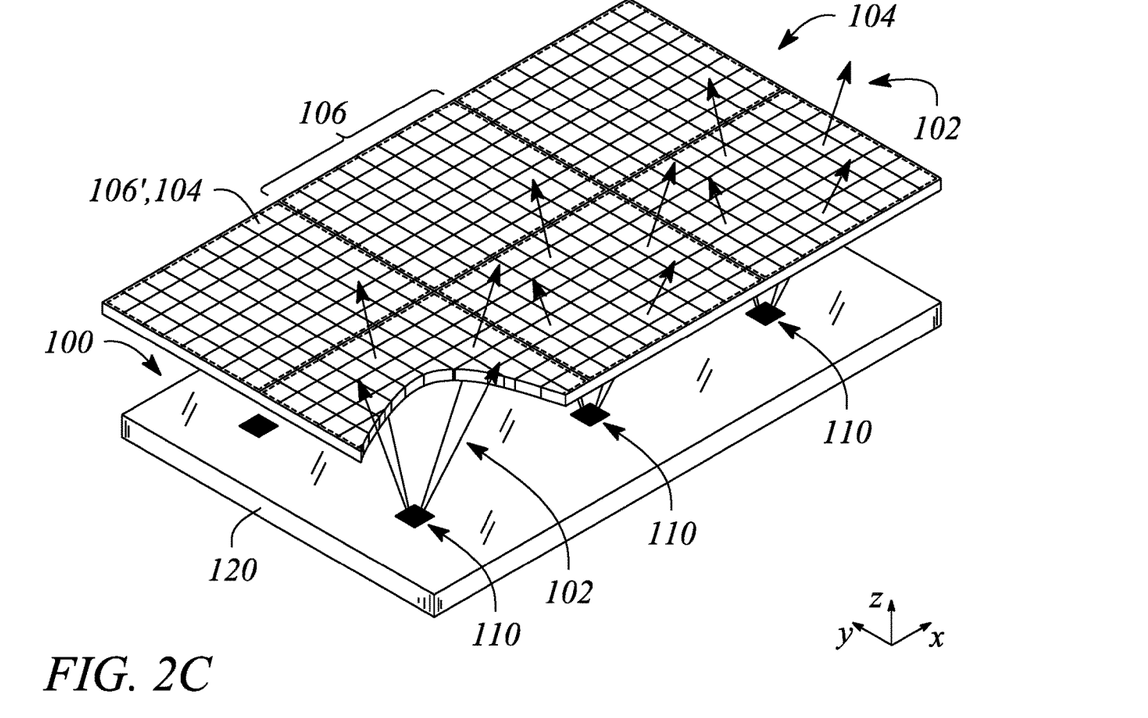
FIG. 2C illustrates a perspective view of a multiview backlight in an example, according to an embodiment consistent with the principles described herein.

According to some embodiments of the principles described herein, a multiview backlight is provided. FIG. 2A illustrates a cross-sectional view of a multiview backlight 100 in an example, according to an embodiment consistent with the principles described herein. FIG. 2B illustrates a plan view of a multiview backlight 100 in an example, according to an embodiment consistent with the principles described herein. FIG. 2C illustrates a perspective view of a multiview backlight 100 in an example, according to an embodiment consistent with the principles described herein. The illustrated multiview backlight 100 may be used to provide backlighting of an electronic display such as a multiview display, for example. In particular, the multiview backlight 100 is configured to emit or provide directional light beams 102. According to various embodiments, the directional light beams 102 provided by the multiview backlight 100 have directions corresponding to view directions of a multiview display or equivalently of a multiview image displayed by the multiview display.

The multiview backlight illustrated in FIGS. 2A-2C comprises an array of active emitters 110 spaced apart from one another. In particular, by definition herein, active emitters 110 of the array are spaced apart from one another according to a finite (i.e., non-zero) inter-emitter distance (e.g., a finite center-to-center distance). Further, the active emitters 110 of the array generally do not intersect, overlap or otherwise touch one another, according to some embodiments. As such, each active emitter 110 of the active emitter array is generally distinct and separated from other ones of the active emitters 110 of the array. In some embodiments, the active emitters 110 may be arranged in a two-dimensional (2D) array (e.g., a rectangular array) having rows and columns, as illustrated in FIGS. 2B and 2C. In other embodiments (not illustrated), the array of active emitters 110 may be either a one-dimensional (1D) such as a linear array or another 2D array including, but not limited to a circular array.

According to various embodiments, an active emitter 110 of the array of active emitters 110 is configured to emit or provide light as a plurality of the directional light beams 102. Further, the directional light beams 102 provided by the active emitter 110 may have different principle angular directions corresponding to respective different view directions of a multiview display or equivalently of a multiview image displayed by the multiview display. FIGS. 2A and 2C illustrate the directional light beams 102 as a plurality of diverging arrows, by way of illustration and not limitation.

According to various embodiments, a size of the active emitter 110 is comparable to a size of a view pixel in a multiview pixel of a multiview display that employs the multiview backlight 100. Herein, the 'size' may be defined in any of a variety of manners to include, but not be limited to, a length, a width or an area. For example, the size of a view pixel may be a length thereof and the comparable size of the active emitter 110 may also be a length of the active emitter 110. The length, in turn, may be equivalent to center-to-center distance between adjacent view pixels, for example. In another example, size may refer to an area such that an area of the active emitter 110 may be comparable to an area of the view pixel.

In some embodiments, the size of the active emitter 110 is comparable to the view pixel size such that the active emitter size is between about fifty percent (50%) and about two hundred percent (200%) of the view pixel size. For example, if the active emitter size is denoted 's' and the view pixel size is denoted 'S' (e.g., as illustrated in FIG. 2A), then the active emitter size s may be given by equation (1) as $$\frac{1}{2}S \le s \le 2S \qquad (1)$$

In other examples, the active emitter size is greater than about sixty percent (60%) of the view pixel size, or about seventy percent (70%) of the view pixel size, or greater than about eighty percent (80%) of the view pixel size, or greater than about ninety percent (90%) of the view pixel size, and the active emitter is less than about one hundred eighty percent (180%) of the view pixel size, or less than about one hundred sixty percent (160%) of the view pixel size, or less than about one hundred forty (140%) of the view pixel size, or less than about one hundred twenty percent (120%) of the view pixel size. For example, by 'comparable size', the active emitter size may be between about seventy-five percent (75%) and about one hundred fifty percent (150%) of the view pixel size. In another example, the active emitter 110 may be comparable in size to the view pixel, where the active emitter size is between about one hundred twenty-five percent (125%) and about eighty-five percent (85%) of the view pixel size. According to some embodiments, the comparable sizes of the active emitter 110 and the view pixel 106' may be chosen to reduce, or in some examples to minimize, dark zones between views of the multiview display, while at the same time reducing, or in some examples minimizing, an overlap between views of the multiview display.

In some embodiments, a distance between adjacent active emitters 110 within the array of active emitters 110 is comparable to or commensurate with a distance between multiview pixels of the multiview display that employs the multiview backlight 100. In particular, a distance (e.g., center-to-center distance) between adjacent active emitters 110 of the active emitter array may be about equal to a center-to-center distance between adjacent multiview pixels. The center-to-center distance may be defined along one or both of a row and a column of each of the array of active emitters 110 with the multiview pixels may be arranged in a commensurate array, for example. As a result, there may be a one-to-one or unique correspondence between a multiview pixel and an individual active emitter 110, according to some embodiments.

By way of example and not limitation, FIGS. 2A-2C further illustrate an array of light valves 104 as well as multiview pixels 106 and view pixels 106' for the purpose of facilitating discussion herein. The illustrated light valve array may be part of a multiview display that employs the multiview backlight 100, for example. As illustrated, light valves 104 of the light valve array are configured to modulate the directional light beams 102. Further, different ones of the directional light beams 102 having different principal angular directions pass through and may be modulated by different ones of the light valves 104 in the light valve array, as illustrated.

In some embodiments, a light valve 104 of the array corresponds to a view pixel 106', while a set of the light valves 104 may correspond to a multiview pixel 106. In particular, a different set of light valves 104 of the light valve array is configured to receive and modulate the directional light beams 102 from different ones of the active emitters 110. As such, there may be one unique set of light valves 104 for each active emitter 110, as illustrated. In various embodiments, different types of light valves may be employed as the light valves 104 of the light valve array including, but not limited to, one or more of liquid crystal light valves, electrophoretic light valves, and light valves based on electrowetting.

Further, in FIG. 2A, a size S of a view pixel 106' corresponds to an aperture size of a light valve 104 in the light valve array, as illustrated. In other examples, the view pixel size may be defined as a distance (e.g., a center-to-center distance) between adjacent light valves 104 of the light valve array. For example, an aperture of the light valves 104 may be smaller than the center-to-center distance between the light valves 104 in the light valve array. Thus, the view pixel size may be defined as either the size of the light valve 104 or a size corresponding to the center-to-center distance between the light valves 104, among other definitions. Also in FIG. 2A, a size s of the active emitter 110 is illustrated as comparable to the view pixel size S.

In some embodiments (e.g., as illustrated in FIG. 2A), an inter-element distance (e.g., center-to-center distance) between a pair of adjacent active emitters 110 may be equal to an inter-pixel distance (e.g., a center-to-center distance) between a corresponding pair of adjacent multiview pixels 106, e.g., represented by light valve sets. For example, as illustrated in FIG. 2A, a center-to-center distance d between a first active emitter 110a and a second active emitter 110b is substantially equal to a center-to-center distance D between a first light valve set 104a and the second light valve set 104b, where each of the light valve sets 104a, 104b represents a different multiview pixel 106. In other embodiments (not illustrated), the relative center-to-center distances of pairs of active emitters 110a, 110b (or active emitters 110) and corresponding light valve sets 104a, 104b may differ, e.g., the active emitters 110 may have an inter-element spacing (i.e., center-to-center distance d) that is one of greater than or less than a spacing (i.e., center-to-center distance D) between light valve sets representing multiview pixels 106.

In some embodiments, a shape of the active emitter 110 is analogous to a shape of the multiview pixel 106 or equivalently, a shape of a set (or 'sub-array') of the light valves 104 corresponding to the multiview pixel 106. For example, the active emitter 110 may have a square shape and the multiview pixel 106 (or an arrangement of a corresponding set of light valves 104) may be substantially square. In another example, the active emitter 110 may have a rectangular shape, i.e., may have a length or longitudinal dimension that is greater than a width or transverse dimension. In this example, the multiview pixel 106 (or equivalently the arrangement of the set of light valves 104) corresponding to the active emitter 110 may have an analogous rectangular shape. FIGS. 2B-2C illustrate square-shaped active emitters 110 and corresponding square-shaped multiview pixels 106 comprising square sets of light valves 104. In yet other examples (not illustrated), the active emitters 110 and the corresponding multiview pixels 106 have various shapes including or at least approximated by, but not limited to, a triangular shape, a hexagonal shape, and a circular shape. More generally, the shape may represent substantially any tileable shape.

According to some embodiments, an active emitter 110 of the active emitter array may comprise a micro light emitting diode (microLED or µLED). Herein, µLED is defined as a microscopic light emitting diode µLED), i.e., an LED having microscopic dimensions. In some embodiments, the µLED may comprise a plurality of µLEDs that, when combined, have size that is comparable to the view pixel size. According to some embodiments, an active emitter 110 of the active emitter array may comprise an organic light emitting diode (OLED). As defined herein, an OLED is an emitter having an emissive electroluminescent film or layer comprising an organic compound configured to emit light in response to an electric current or similar electrical stimulus. In other embodiments, another type of active optical emitter may be used as the active emitter 110 such as, but not limited to, a high intensity LED and a quantum dot LED having a size comparable to the view pixel size.

In some embodiments, the active emitter 110 may be configured to provide light that is substantially monochromatic having a particular color (i.e., the light may include a particular wavelength of light). In other embodiments, the active emitter 110 may be configured to provide polychromatic light such as, but not limited to, white light, that includes a plurality or range of wavelengths. For example, active emitter 110 may be configured to provide one or more of red light, green light, blue light, or a combination thereof. In another example, the active emitter 110 may be configured to provide light that is substantially white light (i.e., the active emitter 110 may be a white µLED or white OLED). In some embodiments, the active emitter 110 may include a micro-lens, a diffraction grating, or another optical film or component configured to provide one or both of collimation (e.g., according to a collimation factor) and polarization control of emitted light or equivalent of the directional light beams 102. The micro-lens, the diffraction grating, or the other optical film or component may also or alternatively be configured to control a direction of the directional light beams 102. Alternatively, one or both of the collimation and polarization control may be provided by an optical layer or film between the active emitter arrays and the light valve array, for example.

Active emitters 110 of the active emitter array may be independently controlled, activated, or powered to provide local dimming and also to enable switching between directional light beam production by the first and second active emitter arrays, according to some embodiments. In particular, in some embodiments, the active emitter(s) 110 of the active emitter array may be configured to provide by selective activation the plurality of directional light beams 102, e.g., during a first time interval or a particular mode.

In some embodiments, the multiview backlight 100 may be associated with a color multiview display configured to provide or display color multiview images. In a color multiview display, different light valves 104 or more specifically different portions of the light valves 104 may provide different colors (e.g., using color filters) and thus may be referred to as 'color sub-pixels' of the light valves 104. In particular, sets of color sub-pixels representing different colors may be provided adjacent to one another to modulate light as different colors light. For example, the different colors of light and corresponding different colors of the color sub-pixels may be red, green, and blue of a red-green-blue (RGB) color model. In some embodiments, the color sub-pixels representing the different colors may alternate along a row of light valves (e.g., as red, green, blue, red, green, blue, and so on). In these embodiments, a light valve 104 or equivalently a view pixel 106' of a multiview pixel 106 may be represented by the set of the color sub-pixels that similarly alternate along a row of the view pixels 106'. As such, a view pixel 106' of the multiview pixel 106 may be represented by a set of three (3) color sub-pixels (e.g., red, green, and blue). In other embodiments (not illustrated), the view pixel 106' may comprise a set of color sub-pixels that is greater than or less than three. In some of these embodiments, the active emitter 110 may comprise a plurality of color emitters having colors that correspond to the color sub-pixels of the set of color sub-pixels of the view pixel 106' (or light valve 104).

In some embodiments, the different color emitters of the active emitter array are offset from one another in one or both of a row direction and a column direction of the active emitter array or of the light valve array. In particular, an offset in the row direction may be configured to substantially reduce or suppress color fringing in the color multiview display associated with the multiview backlight 100, according to some embodiments.

Figure 3A:
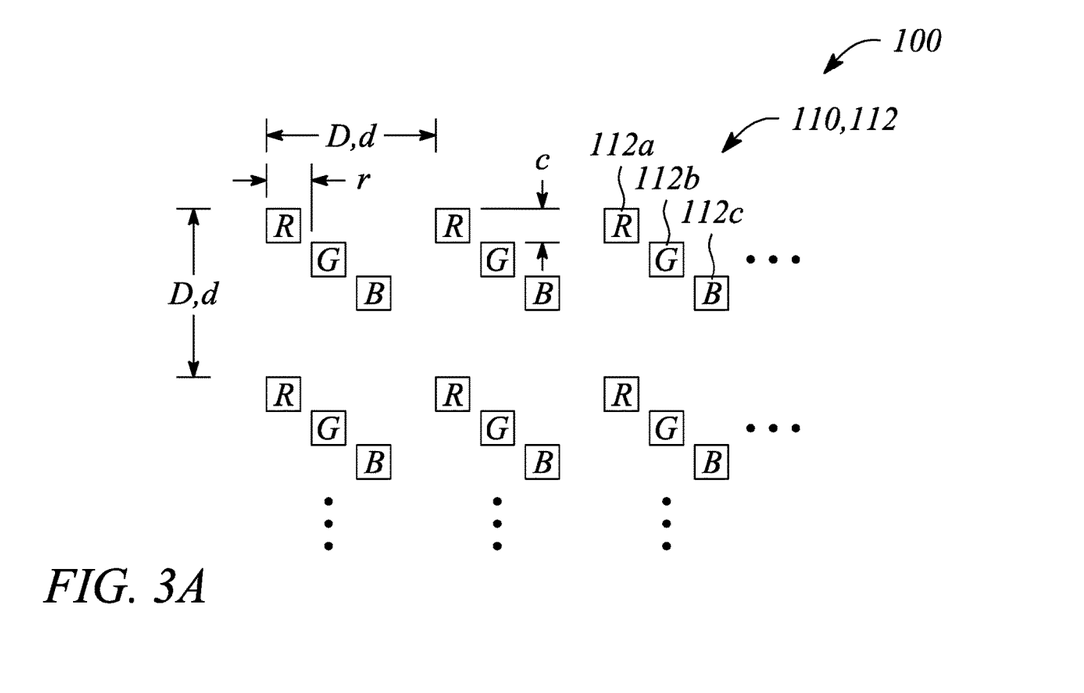
FIG. 3A illustrates a plan view of a multiview backlight in an example, according to an embodiment consistent with the principles described herein.
Figure 3B:
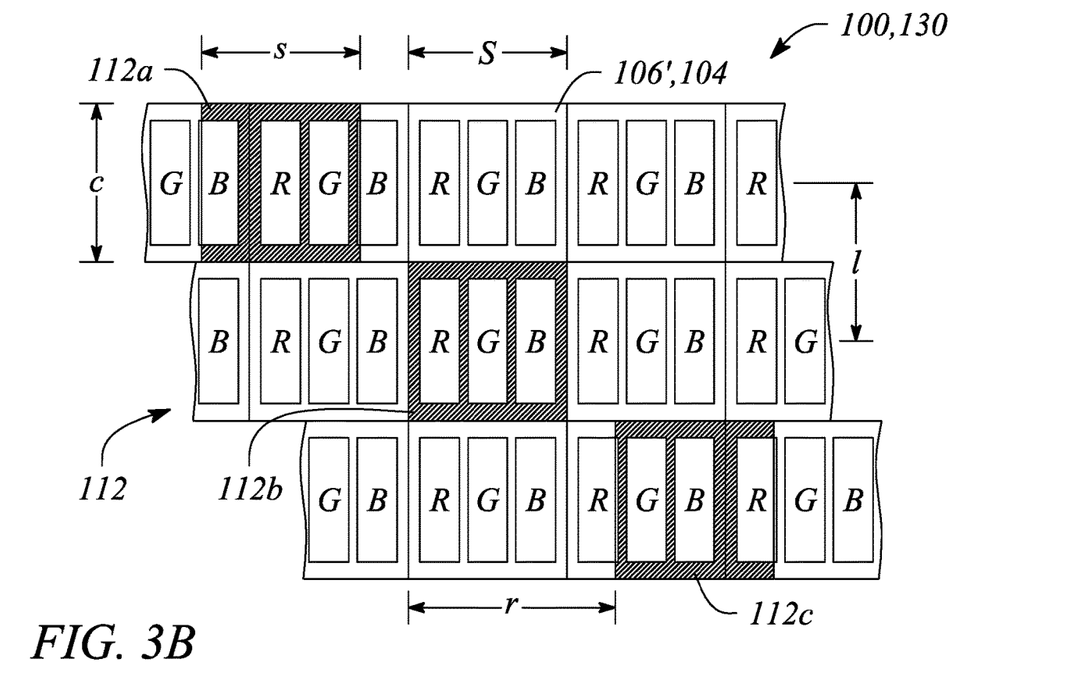
FIG. 3B illustrates a plan view of a portion of the multiview backlight of FIG. 3A along with a portion of a multiview pixel in an example, according to an embodiment consistent with the principles described herein.

FIG. 3A illustrates a plan view of a multiview backlight 100 in an example, according to an embodiment consistent with the principles herein. FIG. 3B illustrates a plan view of a portion of the multiview backlight 100 of FIG. 3A along with a portion of a multiview pixel 106 in an example, according to an embodiment consistent with the principles described herein. In particular, FIG. 3A illustrates active emitters 110 of the multiview backlight 100 with each active emitter 110 comprising a plurality of color emitters 112. In FIG. 3B, the illustrated portion of the multiview pixel 106 comprises a plurality of view pixels 106', or equivalently a plurality of light valves 104, overlaid on the active emitter 110 with the plurality of color emitters 112. The multiview backlight 100 of the embodiment illustrated in FIGS. 3A and 3B may be associated with a color multiview display configured to provide or display color multiview images, for example.

In FIGS. 3A-3B, the active emitter 110 comprises three (3) color emitters 112a, 112b, 112c corresponding to each of three different colors of light (e.g., red light, green light, and blue light), by way of example and not limitation. Further, the three different colors of the color emitters 112a, 112b, 112c correspond to the colors of three different color sub-pixels of view pixels 106' of the multiview pixels 106, as illustrated in FIG. 3B. In particular, FIG. 3B illustrates view pixels 106', where each view pixel 106' comprises three (3) color sub-pixels representing the three different colors red (R), green (G), and blue (B) colors, respectively, of the three different color emitters 112a, 112b, 112c. Crosshatching is employed to distinguish between the color emitters 112a, 112b, 112c and the view pixels 106' in FIG. 3B.

As with the previously described multiview backlight 100, a size of the active emitter 110 of the multiview backlight 100 is comparable to a size of a view pixel 106' of the multiview display associated with multiview backlight 100. Moreover, when the active emitter 110 comprises a plurality of color emitters 112, each of the color emitters 112 may have a size that is comparable to the view pixel size. FIG. 3A illustrates the color emitters 112 (e.g., 112a, 112b, and 112c) each having a size s that is equivalent to the active emitter size s, described above. FIG. 3B illustrates the size S of the view pixel 106' being comparable to the size s of the color emitters 112. Further, a distance d between adjacent active emitters 110 (or, equivalently, color emitters 112 of the same color) in the active emitter array is commensurate with a distance D between adjacent multiview pixels (not illustrated in FIG. 3A) of the multiview display. FIG. 3B also illustrates the color sub-pixels of the view pixels 106' alternating along a row direction of the view pixels 106' (e.g., as R, G, B, R, G, . . . ). Likewise, FIGS. 3A-3B illustrate the color emitters 112 of different colors (i.e., 112a=R, 112b=G, 112c=B) also alternate along the row direction.

Herein, an offset, or equivalently, a distance of an offset between adjacent color emitters 112 is defined as a distance between identical locations on adjacent color emitters 112. For example, the offset may represent the center-to-center distance between the adjacent color emitters 112. In another example, the offset may represent the distance between the same side of adjacent color emitters 112. In some embodiments, a distance of the offset between adjacent color emitters 112 in a row direction is equal to an integer multiple of the view pixel size plus the view pixel size divided by a number of color sub-pixels in the view pixel, the color sub-pixels being arranged within the view pixel 106' in the row direction. In particular, give the view pixel size S and if 'p' denotes the number of color sub-pixels in the view pixel 106', the offset or distance of the offset r between adjacent color emitters 112 along a row or in a row direction of the active emitter array is given by equation (2) as:

$$r = nS + \frac{1}{p}S \quad (2)$$

where 'n' is an integer. For example, as illustrated in FIG. 3A, a color emitter 112a is offset from an adjacent color emitter 112b along the row direction of the active emitter array. Since the view pixel 106' comprises three color sub-pixels (i.e., p=3), the distance r of the offset between adjacent color emitters 112 of the multiview backlight 100 is one-third of the view pixel size S plus S (i.e., r=S+S/3, assuming n=1). In other words, as illustrated in FIG. 3B, adjacent color emitters 112a and 112b are offset in the row direction by a distance corresponding to four (4) color sub-pixels. Similarly, adjacent color emitters 112b and 112c are offset by the four (4) color sub-pixels in the row direction, as illustrated. That is, since each color emitters 112 has the size s equal to that of a view pixel size S, the result of equation (2) is that to provide an offset of adjacent color emitters 112 by a number of color sub-pixels plus one. Note that, in another embodiment (not illustrated), if the integer n equals zero (i.e., n=0), then the offset r between adjacent color emitters 112 is one third of the view pixel size S (i.e., r=S/3). In this case, the color emitters 112 offset in the row direction may overlap.

In some embodiments, the color emitters 112 of the active emitter array are offset from one another in a column direction of the active emitter array orthogonal to the row direction. In particular, the distance of the offset in the column direction may correspond to an integer multiple of a center-to-center distance between rows of view pixels 106' or equivalently of light valves 104 of the light valve array. FIGS. 3A-3B illustrate the offset between adjacent color emitters along a column direction of the active emitter array. If 'l' denotes a center-to-center distance between rows of view pixels 106', the offset 'c' along the column direction of the color emitters (e.g., color emitter 112a and color emitter 112b) may be given by equation (3) as:

$$c = ml \quad (3)$$

where 'm' is an integer. When m=1, the offset c between color emitter 112a and color emitter 112b in the column direction is equal to 1, or the center-to-center distance between rows of view pixels 106', e.g., as illustrated in FIG. 3B. In another embodiment (not illustrated) where m=0, the offset between color emitters in the column direction is zero, or non-existent. In such an embodiment, color emitter 112a and color emitter 112b (and all color emitters 112 for that matter) may align along a row of the array of active emitters 110. Note that, if the integer n is greater than or equal to one (i.e., n≥1) in equation (2) and no overlap exists in the row direction.

Referring again to FIG. 2A, the multiview backlight 100 may further comprise a planar substrate 120, in some embodiments. In particular, the active emitters 110 may be spaced apart across a surface of the planar substrate 120. The planar substrate 120 may further comprise electrical interconnects to provide power to the active emitters 110. In some embodiments, the planar substrate 120 is configured to be optically transparent or at least substantially optically transparent (i.e., may be a planar transparent substrate). For example, the planar substrate 120 may comprise an optically transparent material capable of transmitting light from a first side to a second side of the planar substrate 120. Further, electrical interconnects may be optically transparent, in some embodiments. Moreover, a combination of the array of active emitters 110 and the planar substrate 120 (e.g., along with the electrical interconnects) may be configured to be optically transparent, in some embodiments.

According to some embodiments, the multiview backlight 100 may further comprise a broad-angle backlight adjacent to the planar substrate 120. The broad-angle backlight may be configured to provide broad-angle emitted light. Further, a combination of the array of active emitters 110 and the planar substrate 120 may be configured to be transparent to the broad-angle emitted light, according to various embodiments. Thus, broad-angle light may be emitted from the broad-angle backlight and pass through a thickness of the planar substrate of the multiview backlight 100.

Figure 4:
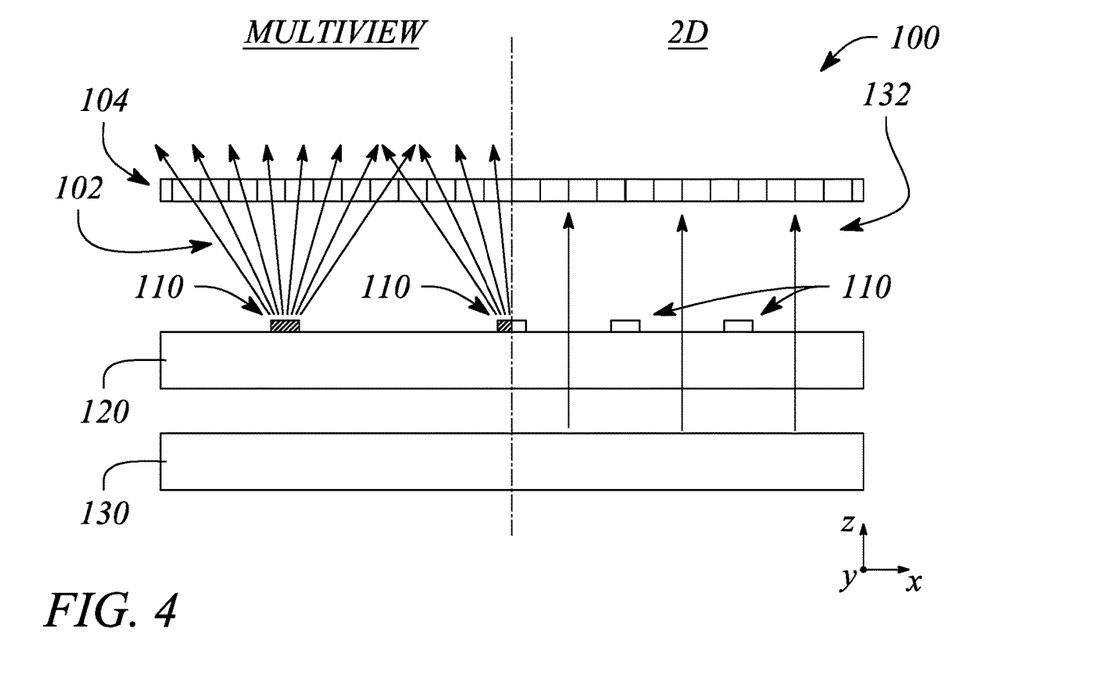
FIG. 4 illustrates a cross-sectional view of a multiview backlight including a broad-angle backlight in an example, according to an embodiment consistent with the principles described herein.

FIG. 4 illustrates a cross-sectional view of a multiview backlight 100 including a broad-angle backlight 130 in an example, according to an embodiment consistent with the principles described herein. In particular, FIG. 4 illustrates the broad-angle backlight 130 adjacent to a surface of the planar substrate 120 with active emitters 110 arranged on an opposite surface. FIG. 4 further illustrates an array of light valves 104 adjacent to the opposite surface of the planar substrate 120.

As illustrated on a left side of FIG. 4, a multiview image (MULTIVIEW) may be provided using the multiview backlight 100 by activating the active emitters 110 to provide directional light beams 102. Alternatively, as illustrated on a right side of FIG. 4, a two-dimensional (2D) image may be provided by inactivating the active emitters 110 and activating the broad-angle backlight 130 to provide broad-angle emitted light 132 to the array of light valves 104. As such, the multiview backlight 100 including the broad-angle backlight 130 and the planar substrate 120 configured to be transparent may be used to implement an electronic display that may be switched between displaying a multiview image and displaying a 2D image, according to various embodiments. Herein, active emitters 110 are illustrated as being activated by using crosshatching, while active emitters 110 without crosshatching represent an inactivated state or condition.

Figure 5:
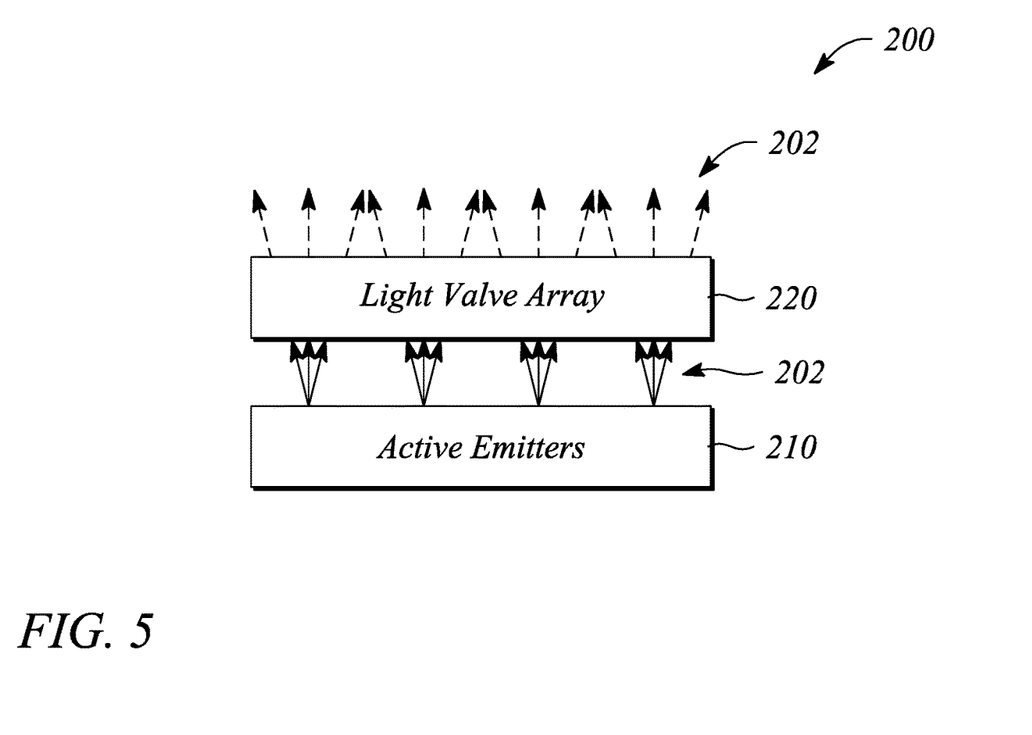
FIG. 5 illustrates a block diagram of a multiview display in an example, according to an embodiment consistent with the principles described herein.

In accordance with some embodiments of the principles described herein, a multiview display is provided. The multiview display is configured to display a multiview image, according to various embodiments. FIG. 5 illustrates a block diagram of a multiview display 200 in an example, according to an embodiment consistent with the principles described herein. As illustrated, the multiview display 200 comprises an array of active emitters 210. The active emitters 210 of the active emitter array may be spaced apart from one another on a planar substrate, according to some embodiments. The active emitters 210 of the active emitter array are configured to provide directional light beams 202 having different principal angular directions corresponding to different view directions of a multiview image. The multiview display 200 further comprises an array of light valve 220 configured to modulate the directional light beams 202 and provide the multiview image. Light valves 220 of the light valve array are arranged as a plurality of multiview pixels (i.e., different sets of light valves 220 correspond to different multiview pixels). According to various embodiments, a size of an active emitter 210 of the active emitter array is between one-half and two times a size of a light valve 220 of the light valve array. Further, a distance between adjacent active emitters 210 is commensurate with a distance between adjacent multiview pixels, according to various embodiments.

In some embodiments, the array of active emitters 210 may be substantially similar to the array of active emitters 110, described above with respect to the multiview backlight 100. In particular, active emitters 210 of the active emitter array may comprise one or both of a micro light emitting diode (µLED) and an organic light emitting diode (OLED). In some embodiments, the array of light valves 220 may be substantially similar to the array of light valves 104 of the above-described multiview backlight 100. In particular, each light valve 220 of the light valve array may comprise a plurality of color sub-pixels arranged within the light valve in a row direction of the light valve array. Further, active emitters 210 of the active emitter array may comprise a plurality of color emitters configured to emit light having colors corresponding to colors of the color sub-pixels. For example, the colors may comprise red, green, and blue. The color emitters may be substantially similar to the color emitters 112 of the active emitters 110, in some embodiments. In some embodiments, the planar substrate may be substantially similar to the planar substrate 120 described above with respect to the multiview backlight 100.

In some embodiments, color emitters of each active emitter 210 may be offset from one another in the row direction of the light valve array by a distance equal to an integer multiple of the light valve size plus the light valve size divided by a number of color sub-pixels in the light valve. In some embodiments, the color emitters of each active emitter 210 may be offset from one another in a column direction of the light valve array orthogonal to the row direction by a distance corresponding to an integer multiple of a center-to-center distance between rows of light valve array in the column direction.

In some embodiments (not illustrated), the multiview display 200 further comprises a broad-angle backlight adjacent to the planar substrate. The broad-angle backlight may be configured to provide broad-angle emitted light. According to various embodiments, a combination of the array of active emitters 210 and the planar substrate is configured to be transparent to the broad-angle emitted light. In some embodiments, the broad-angle backlight may be substantially similar to the broad-angle backlight 130 of the multiview backlight 100, described above. In some embodiments that include the broad-angle backlight, the multiview display 200 is configured to display the multiview image during a first mode using the directional light beams 202 provided by the active emitters 210 and modulated by the light valve array. Further, the multiview display 200 may be configured to display a two-dimensional (2D) image during a second mode using the broad-angle emitted light provided by the broad-angle backlight and modulated by the light valve array.

Figure 6:
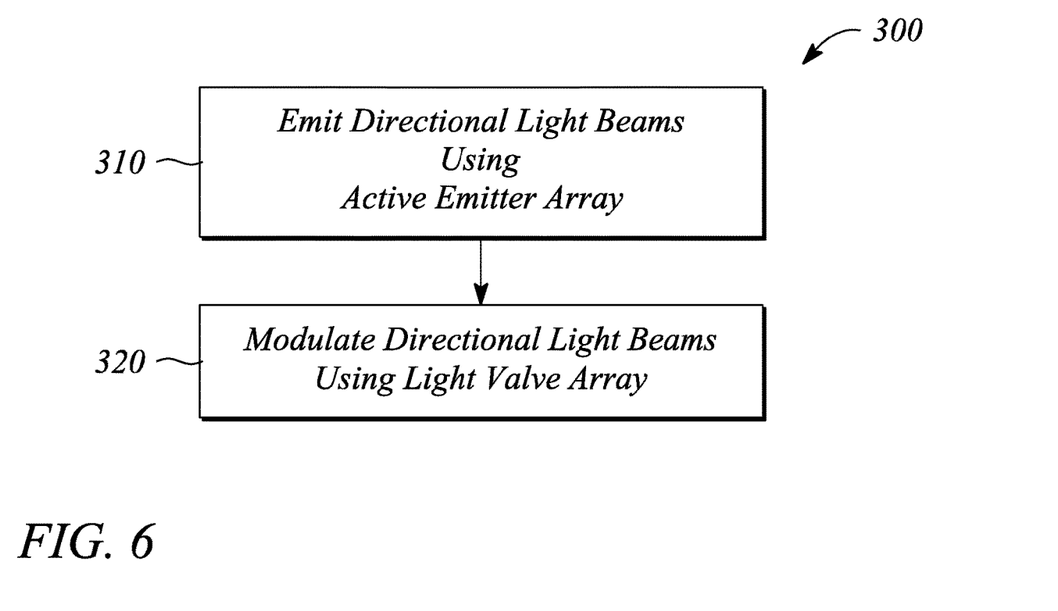
FIG. 6 illustrates a flow chart of a method of multiview display operation, according to an embodiment consistent with the principles disclosed herein.

In accordance with some embodiments of the principles herein, a method of multiview display operation is provided. FIG. 6 illustrates a flow chart of a method 300 of multiview display operation in an example, according to an embodiment consistent with the principles described herein. The method comprises emitting 310 a plurality of directional light beams using an array of active emitters spaced apart on a planar substrate. In some embodiments, the active emitters of the active emitter array are substantially similar to the active emitters 110 of the multiview backlight 100, described above. In particular, the active emitters of the active emitter array are configured to provide directional light beams having principal angular directions corresponding to different view directions of a multiview image. In some embodiments, the active emitters of the active emitter array are configured to provide white light. In some embodiments, the active emitters of the active emitter array are configured to provide light having a color.

The method 300 further comprises modulating 320 the plurality of directional light beams using an array of light valves arranged as a plurality of multiview pixels to display the multiview image. The array of light valves may be substantially similar to the array of light valves 104, previously described with respect to the multiview backlight 100. In particular, directional light beams from the array of active emitters on the planar substrate may pass through and be modulated 320 by individual light valves of the light valve array to provide modulated directional light beams representing views of the multiview image. Different ones of the directional light beams having different principal angular directions are configured to pass through and be modulated 320 by different ones of the light valves in the light valve array, according to various embodiments.

Further, a size of an active emitter of the active emitter array is comparable to a size of a light valve of the light valve array, according to various embodiments. Specifically, a size of an active emitter of the active emitter array may be between one-half and two times a size of a light valve of the array of light valves. In addition, according to various embodiments, a distance between adjacent active emitters in the active emitter array is commensurate with a distance between adjacent multiview pixels. In particular, an inter-element distance (e.g., center-to-center distance) between a pair of adjacent active emitters of the array may be equal to an inter-pixel distance (e.g., a center-to-center distance) between a corresponding adjacent pair of multiview pixels, e.g., represented by light valve sets.

In some embodiments, each light valve of the light valve array comprises a plurality of color sub-pixels arranged within the light valve in a row direction of the light valve array. In particular, sets of color sub-pixels representing red-green-blue (RGB) may be provided adjacent to one another in the light valve array. For example, color sub-pixels representing the different colors may alternate along a row of pixels (e.g., as red, green, blue, red, green, blue, and so on).

In some embodiments, emitting the plurality of directional light beams comprises emitting a different color of light as the plurality of directional light beams from each color emitter of a plurality of color emitters, active emitters of the active emitter array comprising the plurality of color emitters and each different color of light corresponding a color of a different color sub-pixel of a plurality of color sub-pixels in a light valve of the light valve array. In embodiments where sets of color sub-pixels provided adjacent to one another in the light valve array represent red, green, and blue, the colors emitted by the color emitters may correspondingly comprise red, green, and blue.

In some embodiments (not illustrated), the method 300 further comprises providing broad-angle emitted light using a broad-angle backlight adjacent to a surface of the planar substrate opposite to a surface of the planar substrate adjacent to the light valve array. The broad angle backlight is configured to provide broad angle light toward the planar substrate of the multiview display. In various embodiments, a combination of the array of active emitters and the planar substrate is transparent to the broad-angle emitted light. As a result, the broad-angle light from the broad-angle backlight is transmitted through a thickness of the planar substrate and emitted by the planar substrate as emitted broad-angle light.

In some embodiments (not illustrated), the method 300 further comprises modulating the broad-angle emitted light using the array of light valves to display a two-dimensional (2D) image. The multiview image may be displayed during a first mode by emitting and modulating the plurality of directional light beams, as previously described. Further, the two-dimensional image may be displayed during a second mode by providing and modulating the broad-angle emitted light.

Thus, there have been described examples and embodiments of a multiview backlight, a multiview display, and a method of backlight operation comprising active emitters. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A multiview backlight comprising:
    an array of active emitters spaced apart from one another,
        an active emitter of the active emitter array comprising a plurality of color emitters offset from one another in a row direction of the active emitter array and being configured to emit light as a plurality of directional light beams having different principal angular directions corresponding to respective different view directions of a multiview display,
    wherein a size of the active emitter is comparable to a size of a view pixel in a multiview pixel of the multiview display, the view pixel comprising color sub-pixels arranged within the view pixel in the row direction and the offset of color emitters of the active emitter in the row direction being a distance equal to an integer multiple of the view pixel size plus the view pixel size divided by a number of the color sub-pixels in the view pixel, and wherein a distance between adjacent active emitters in the active emitter array is commensurate with a distance between adjacent multiview pixels of the multiview display.

2. The multiview backlight of claim 1, wherein the active emitter comprises a micro light emitting diode (µLED).

3. The multiview backlight of claim 1, wherein the active emitter comprises an organic light emitting diode (OLED).

4. The multiview backlight of claim 1, wherein the active emitter is configured to emit white light.

5. The multiview backlight of claim 1, wherein a color emitter of the plurality of color emitters has a size corresponding to the view pixel size and being is configured to emit light having a color of a corresponding color sub-pixel in the view pixel.

6. The multiview backlight of claim 1, wherein color emitters of the active emitter are offset from one another in a column direction of the active emitter array orthogonal to the row direction by a distance corresponding to an integer multiple of a center-to-center distance between rows of view pixels of the multiview display.

7. The multiview backlight of claim 1, further comprising a planar substrate, active emitters of the active emitter array being spaced apart across a surface of the planar substrate.

8. The multiview backlight of claim 7, further comprising a broad-angle backlight adjacent to the planar substrate, the broad-angle backlight being configured to provide broad-angle emitted light and the planar substrate being optically transparent, wherein a combination of the array of active emitters and the planar substrate is configured to be transparent to the broad-angle emitted light.

9. A display comprising the multiview backlight of claim 1, the display further comprising an array of light valves configured to modulate directional light beams of the plurality of directional light beams to provide a multiview image, a view pixel corresponding to a light valve of the array of light valves, a multiview pixel corresponding to a set of light valves of the array of light valves, and the display being the multiview display.

10. A multiview display comprising:
    an array of active emitters spaced apart from one another on a planar substrate, active emitters of the active emitter array being configured to provide directional light beams having different principal angular directions corresponding to different view directions of a multiview image;
    a broad-angle backlight adjacent to the planar substrate and configured to provide broad-angle emitted light, a combination of the array of active emitters and the planar substrate being configured to be transparent to the broad-angle emitted light; and
    an array of light valves configured to modulate the directional light beams and provide the multiview image, the array of light valves being arranged as a plurality of multiview pixels,
    wherein a size of an active emitter of the active emitter array is between one-half and two times a size of a light valve of the light valve array, and wherein a distance between adjacent active emitters is commensurate with a distance between adjacent multiview pixels.

11. The multiview display of claim 10, wherein the active emitters comprise one or both of a micro light emitting diode (µLED) and an organic light emitting diode (OLED).

12. The multiview display of claim 10, wherein each light valve of the light valve array comprises a plurality of color sub-pixels arranged within the light valve in a row direction of the light valve array, and wherein active emitters of the active emitter array comprise a plurality of color emitters configured to emit light having colors corresponding to colors of the color sub-pixels, the colors comprising red, green, and blue.

13. The multiview display of claim 12, wherein color emitters of each active emitter are offset from one another in the row direction of the light valve array by a distance equal to an integer multiple of the light valve size plus the light valve size divided by a number of color sub-pixels in the light valve, and wherein the color emitters of each active emitter are offset from one another in a column direction of the light valve array orthogonal to the row direction by a distance corresponding to an integer multiple of a center-to-center distance between rows of light valve array in the column direction.

14. The multiview display of claim 10, wherein the multiview display is configured to display the multiview image during a first mode using the directional light beams provided by the active emitters and modulated by the light valve array, and wherein the multiview display is configured to display a two-dimensional (2D) image during a second mode using the broad-angle emitted light provided by the broad-angle backlight and modulated by the light valve array.

15. A method of multiview display operation, the method comprising:
 emitting a plurality of directional light beams using an array of active emitters spaced apart on a planar substrate, directional light beams of the plurality of directional light beams having different principal angular directions corresponding to respective different view directions of a multiview image;
 providing broad-angle emitted light using a broad-angle backlight adjacent to a surface of the planar substrate, a combination of the array of active emitters and the planar substrate being transparent to the broad-angle emitted light; and
 modulating the plurality of directional light beams using an array of light valves arranged as a plurality of multiview pixels to display the multiview image,
 wherein a size of an active emitter of the active emitter array is comparable to a size of a light valve of the light valve array and a distance between adjacent active emitters in the active emitter array is commensurate with a distance between adjacent multiview pixels.

16. The method of multiview display operation of claim 15, wherein an active emitter of the array of active emitters emits white light.

17. The method of multiview display operation of claim 15, wherein emitting the plurality of directional light beams comprises emitting a different color of light as the plurality of directional light beams from each color emitter of a plurality of color emitters, active emitters of the active emitter array comprising the plurality of color emitters and each different color of light corresponding a color of a different color sub-pixel of a plurality of color sub-pixels in a light valve of the light valve array.

18. The method of multiview display operation of claim 17, further comprising:
 modulating the broad-angle emitted light using the array of light valves to display a two-dimensional (2D) image,
 wherein the multiview image is displayed during a first mode by emitting and modulating the plurality of directional light beams, and wherein the two-dimensional image is displayed during a second mode by providing and modulating the broad-angle emitted light.

19. The method of multiview display operation of claim 17, wherein an active emitter of the array of active emitters comprises a plurality of color emitters offset from one another in the row direction of the light valve array by a distance equal to an integer multiple of the light valve size plus the light valve size divided by a number of color sub-pixels in the light valve.

20. The method of multiview display operation of claim 19, wherein color emitters of each active emitter are offset from one another in a column direction of the light valve array orthogonal to the row direction by a distance corresponding to an integer multiple of a center-to-center distance between rows of light valve array in the column direction.

* * * * *